United States Patent

[11] 3,590,227

[72] Inventors Lawrence C. Porter
　　　　　　　Palos Verdes Peninsula;
　　　　　　　Kenneth E. Graves, Saratoga, both of,
　　　　　　　Calif.
[21] Appl. No. 733,712
[22] Filed May 31, 1968
[45] Patented June 29, 1971
[73] Assignee The Upjohn Company
　　　　　　　Kalamazoo, Mich.
　　　　　　　Continuation-in-part of application Ser. No.
　　　　　　　701,596, Jan. 30, 1968, now Patent No.
　　　　　　　3,464,217.

[54] METHOD AND APPARATUS FOR DIGITAL MEASUREMENT AND CONTROL OF A MATERIAL BLENDING OPERATION
　　　55 Claims, 9 Drawing Figs.
[52] U.S. Cl. .................................................. 235/151.12,
　　　　　　　　　　　　　　　　　　　235/92, 235/151.34
[51] Int. Cl. ........................................................ G06p 15/46
[50] Field of Search ........................................... 235/151.12,
　　　151.34, 151.35, 150.3, 92; 318/20.360; 328/129,
　　　　　　　　　　　　　　　　　　　　　　　　　133, 137

[56] References Cited
UNITED STATES PATENTS

| | | | |
|---|---|---|---|
| 3,009,098 | 11/1961 | Simons, Jr. | 235/151.35 X |
| 3,088,315 | 5/1963 | Withers | 235/151.34 X |
| 3,119,995 | 1/1964 | Burk et al. | 235/151.35 UX |
| 3,219,046 | 11/1965 | Waugh | 235/151.34 X |
| 3,229,077 | 1/1966 | Gross | 235/92 (30) UX |
| 3,342,199 | 9/1967 | McEvoy | 235/151.12 X |
| 3,474,815 | 10/1969 | Beahm et al. | 235/151.34 X |

Primary Examiner—Malcolm A. Morrison
Assistant Examiner—Joseph F. Ruggiero
Attorneys—Donald H. Fidler and Edmund F. Bard ABSTRACT: This invention includes digital control methods and apparatus for measuring a plurality of different operating parameters of a system or process, and for adjusting each of these parameters according to a preselected formulation. A scanner circuit may be employed to sequentially sample each of a plurality of measurement frequencies, and a function of each sample may be compared with a predetermined value to derive a suitable correction.

LAWRENCE C. PORTER
KENNETH E. GRAVES
INVENTORS

BY Arnold, Roylance,
Kruger & Durkee
ATTORNEYS 3,590,227

METHOD AND APPARATUS FOR DIGITAL MEASUREMENT AND CONTROL OF A MATERIAL BLENDING OPERATION

RELATED CASES

This is a continuation-in-part of a copending patent application Ser. No. 701,596, filed Jan. 30, 1968 now Pat. No. 3,464,217, by Lawrence C. Porter and Kenneth E. Graves. A copending patent application, Ser. No. 733,533, filed May 31, 1968 by Lawrence C. Porter and Kenneth E. Graves, discloses and claims a multiplier which is disclosed in combination with the present controller.

BACKGROUND OF THE INVENTION

This invention relates to digital methods and apparatus for controlling a plurality of system parameters according to a predetermined formulation, and more particularly, relates to digital methods and apparatus for controlling a material blending operation and the like.

It is well known to continually blend different flows or inputs of material according to a preselected formulation, and it is old to control the magnitude of selected ones of such inputs or other system parameters according to periodic samples of each input value of parameter. In systems of the type depicted in the aforementioned patent application Ser. No. 701,596, one or more of the various system parameters may have a disproportionate effect on the character of the output product. Further, a change in the magnitude of one parameter may produce a disproportionate change in different ones of the other system parameters.

Various techniques have been proposed and employed to control systems of this character. However, no control method or apparatus has previously been developed which will render any system truly "self-balancing" wherein a highly sensitive reaction is involved. All prior art control techniques are designed to operate on the bases of binary numbers, wherein each parameter is measured in terms of fundamental value units such as mass transfer units, belt travel, and the like. The language of binary numbers is not one with which the average operator is familiar, and thus it has been necessary to mate the controller system to the operating or production system. It is desirable to employ digital rather than analog control techniques for sensitive systems of this character, since analog control circuits are well known to be expensive as well as difficult to operate with precision over extended periods of time. On the other hand, it is expensive and difficult to mate a digital control system to the usual production system, since the handling and registering of parameter measurements derived in the usual manner and form is inherently incompatible with the fundamental concept of digital logic and theory.

SUMMARY OF INVENTION

These disadvantages of the prior art are overcome with the present invention, and novel methods and apparatus are provided herein for providing precision control of the various parameters of a continuous process. In particular, wherein a blending system or the like is sought to be controlled, measurement signals are continuously derived separately and independently of each other which are pulse trains having a frequency representative of mass transfer rate, rather than mass transfer as in the case of control techniques of the prior art.

As will be apparent, the pulses in each measurement frequency are generated in a random manner relative to the pulses in the other frequencies, and thus a scanner circuit is preferably provided for the purpose of sorting the various input pulses whereby they may be selected and sampled without being lost. In the preferred form of the present invention, one parameter is selected as a base with respect to each of the other parameters sought to be measured and controlled, and thus a ratio of each parameter is established with respect to each of the other parameters. Means and methods are preferably provided for the purpose of deriving sequential samples of each of these ratios and for comparing each sample with a preselected value representing the ratio sought to be attained.

An error system and method is also preferably included for the purpose of deriving the apparent error (if any) as a function of the difference in pulses between each sampled ratio and the preselected or preestablished ratio sought to be attained, and this apparent error is preferably adjusted to derive the true error between the actual measured mass transfer rate and the preset mass transfer rate. In addition, novel means and methods are provided for measuring and correcting total throughput rate as well as the rate of the throughput of each component or constituent in the process.

DRAWINGS

These and other objects and features of the present invention will be apparent from the following detailed description, wherein reference is made to the figures in the accompanying drawings.

DETAILED DESCRIPTION

Figure 1:
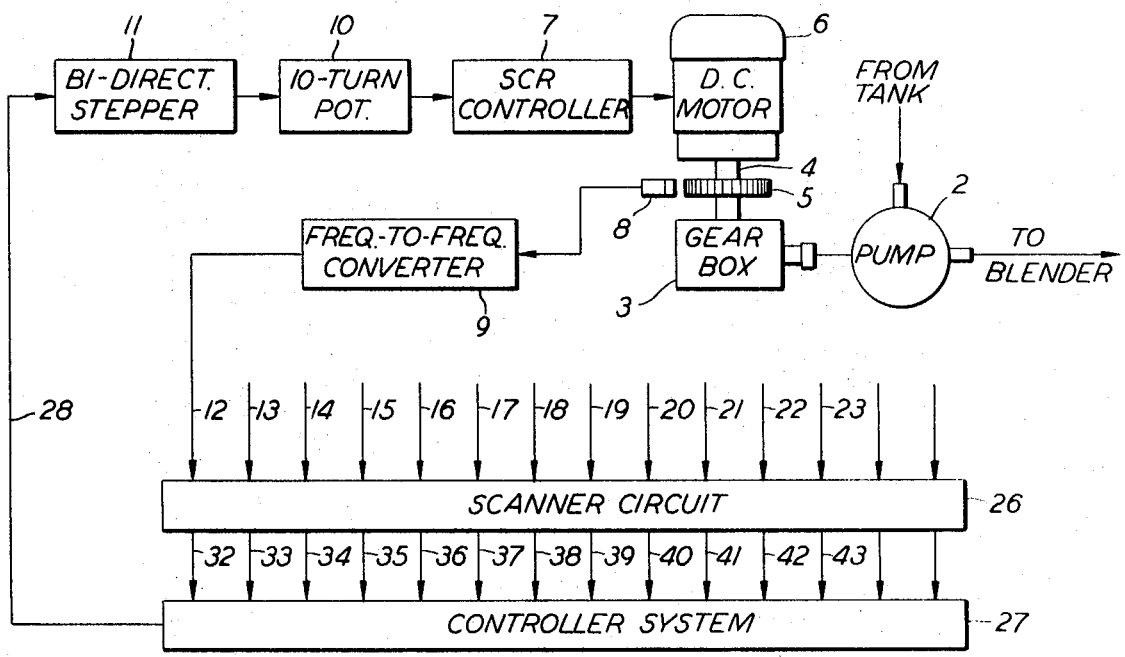
FIG. 1 is a simplified functional representation of the major relative components of a typical material blending system, illustrating one throughput measurement and control loop, and including a functional representation of suitable scanner circuit for receiving and sorting the various measurement input frequencies.

Referring now to FIG. 1, there may be seen a functional representation of a suitable control apparatus including a scanner circuit 26 for receiving and sorting any number of different mass transfer rate or other measurement frequencies 12—25 (as more particularly described in the aforesaid patent application Ser. No. 701,596), and for transmitting appropriate pulse trains 32—45 corresponding to signals 12—25 into a controller system 27. Each of the signals 12—25 may be derived in any suitable manner. For example, a pump 2 which is driven by a DC motor 6 and shaft 4 to a gearbox 3, may transfer resin, or the like, and a suitable spur gear 5 having magnetically tipped teeth may be mounted on the shaft 4 to cause a magnetic pickup 8 to generate a frequency functionally related to the velocity of the motor 6.

As will hereinafter be explained in detail, it is desired that the measurement signal 32 transmitted to the controller 27 be an accurate representation of resin transfer rate rather than motor velocity. Accordingly, a suitable frequency-to-frequency converter 9 (see FIG. 1) may be provided to generate signal 12 as a pulse train having a frequency functionally representative of resin transfer rate.

It is the function of the controller to analyze signal 32, and if a suitable correction is required, to generate a suitable adjustment signal 28 to a bidirectional stepper motor 11 which adjusts a 10-turn potentiometer 10 so as to appropriately adjust a silicon controlled rectifier 7. The motor 6 turns the shaft 4 in a manner determined by the SCR controller 7, and thus the output of the pump 2 is appropriately adjusted as desired.

Figure 2A:
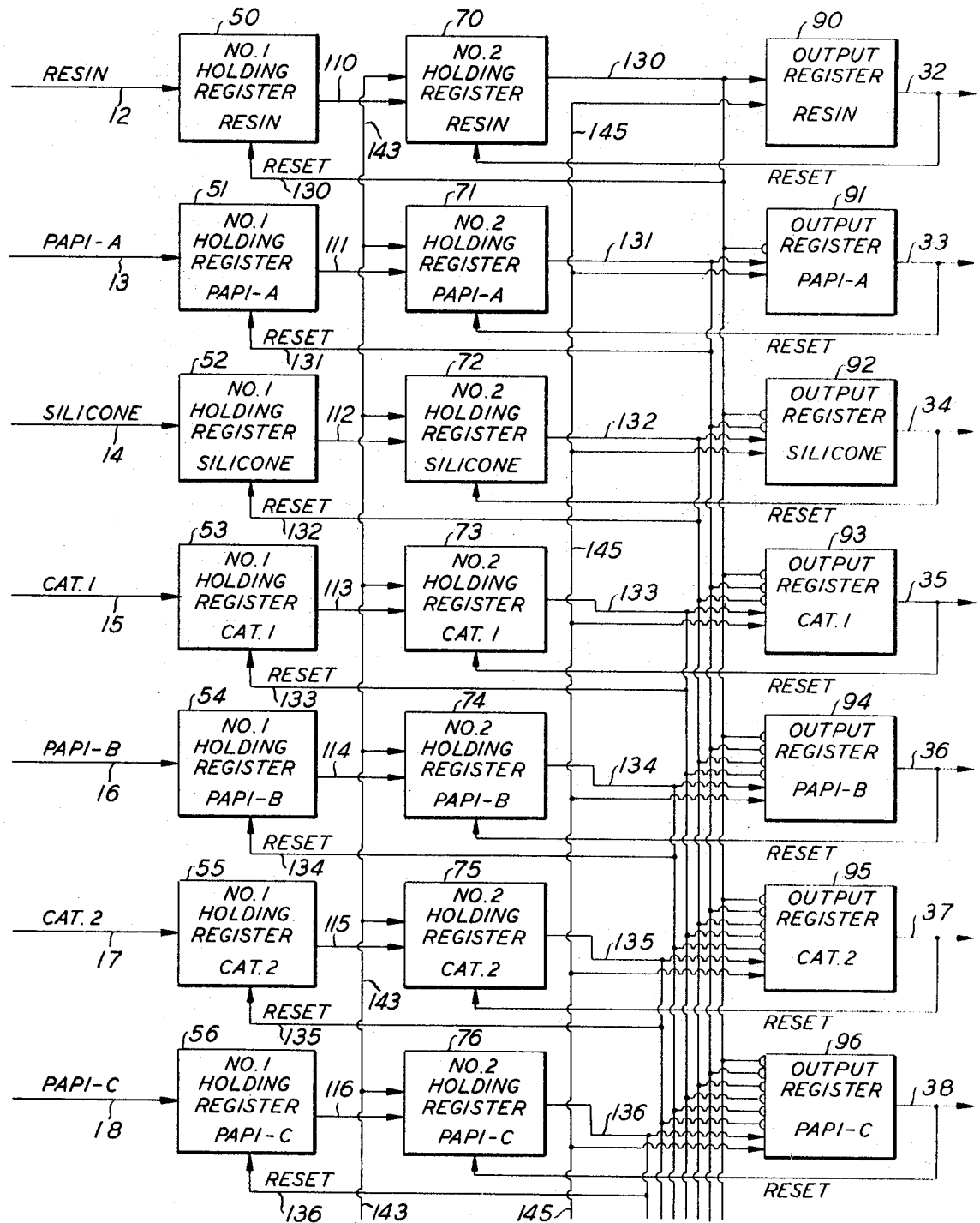
FIGS. 2A and 2B are a functional representation of the details of a scanner circuit suitable for purposes of the present invention.
Figure 2B:
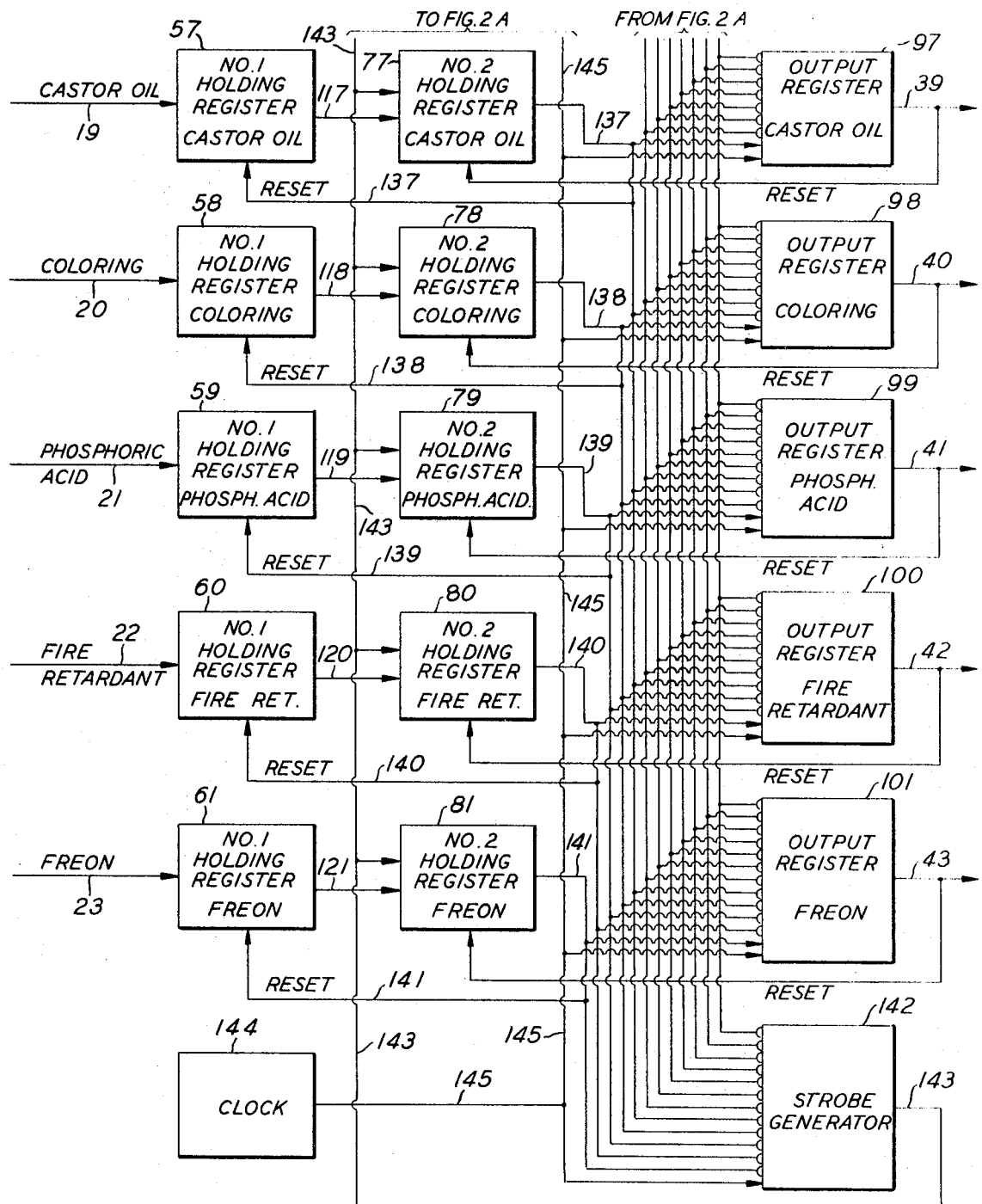

Referring now to FIGS. 2A and 2B, there may be seen a more detailed functional representation of a suitable embodiment of the scanner circuit 26 indicated generally in FIG. 1. It is the function of the scanner circuit 26 illustrated in FIG. 1 to receive pulses which are random, asynchronous, and often coincident, from input conductors 12—23 and to convert or translate such pulses into a train of pulses synchronous with the system and separate in time. Accordingly, in FIGS. 2A and 2B, there may be seen an array of 12 or more DC latch circuits, which are hereinafter referred to as No. 1 holding registers 50—61, and which are connected to conductors 12—23, respectively, to receive the aforementioned random, asynchronous, and often coincident pulses. In addition, the No. 1 holding registers 50—61 may be also seen to generate output signals 110—121 to a secondary array of DC latch circuits hereinafter called No. 2 holding registers 70—81, respectively.

The output signals 130—141 from the No. 2 holding registers, respectively, may be seen to be each applied as a reset signal to the corresponding ones of the No. 1 holding registers 50—61, respectively, as well as to the input terminals of corresponding ones of an array of output registers 90—101, respectively, as illustrated in FIG. 2. Each of the output registers 90—101, which are each preferably composed of a bistable multivibrator circuit with an inhibitor circuit in the input portion, delivers their respective output signals into conductors 32—43 leading to the gating network 160 hereinafter depicted in FIG. 4.

As may be seen, each of the No. 1 holding registers 50—61 is adapted to be reset by appropriate ones of the output signals 130—141 from the No. 2 holding registers 70—81. Similarly, the No. 2 holding registers 70—81 are adapted to be reset by the corresponding output signals from respective ones of the output registers 90—101. Each of the No. 2 holding registers 70—81 is further adapted to function as AND circuits and is connected to receive output signals 143 from a strobe generator 142 as well as the output signal from the corresponding one of the No. 1 holding registers 50—61. For example, the resin No. 1 holding register 50 receives and accumulates pulses continuously from conductor 12. When the resin No. 1 holding register 50 receives a pulse from conductor 12, this pulse is held and is not transferred to the resin No. 2 holding register 70 until the next succeeding strobe signal 143 arrives from the strobe generator 142. In addition, output signal 130 is applied as a reset signal to the resin No. 1 holding register 50 and as an inhibiting signal to each of the other output registers 91—101 and as an inhibiting signal to the strobe generator 142, which responds only to the receipt of a clock output signal 145 during the absence of any of the signals 130—141 from the No. 2 holding registers 70—81.

Each of the output registers 98—101, other than the resin output register 97, may be seen to be provided with inhibitor circuitry as well as being adapted to function as AND circuits with respect to the output signal 145 from the clock 144 and the corresponding ones of the output signals 130—141 from the No. 2 output registers 70—81. In the case of the resin output register 90, only the clock output signal 145 and the output signal 130 from the resin No. 2 holding register 70 are received. When both such inputs are received, however, the resin output register 90 will generate an output in conductor 32 which also resets the resin No. 2 holding register 70.

Figure 4:
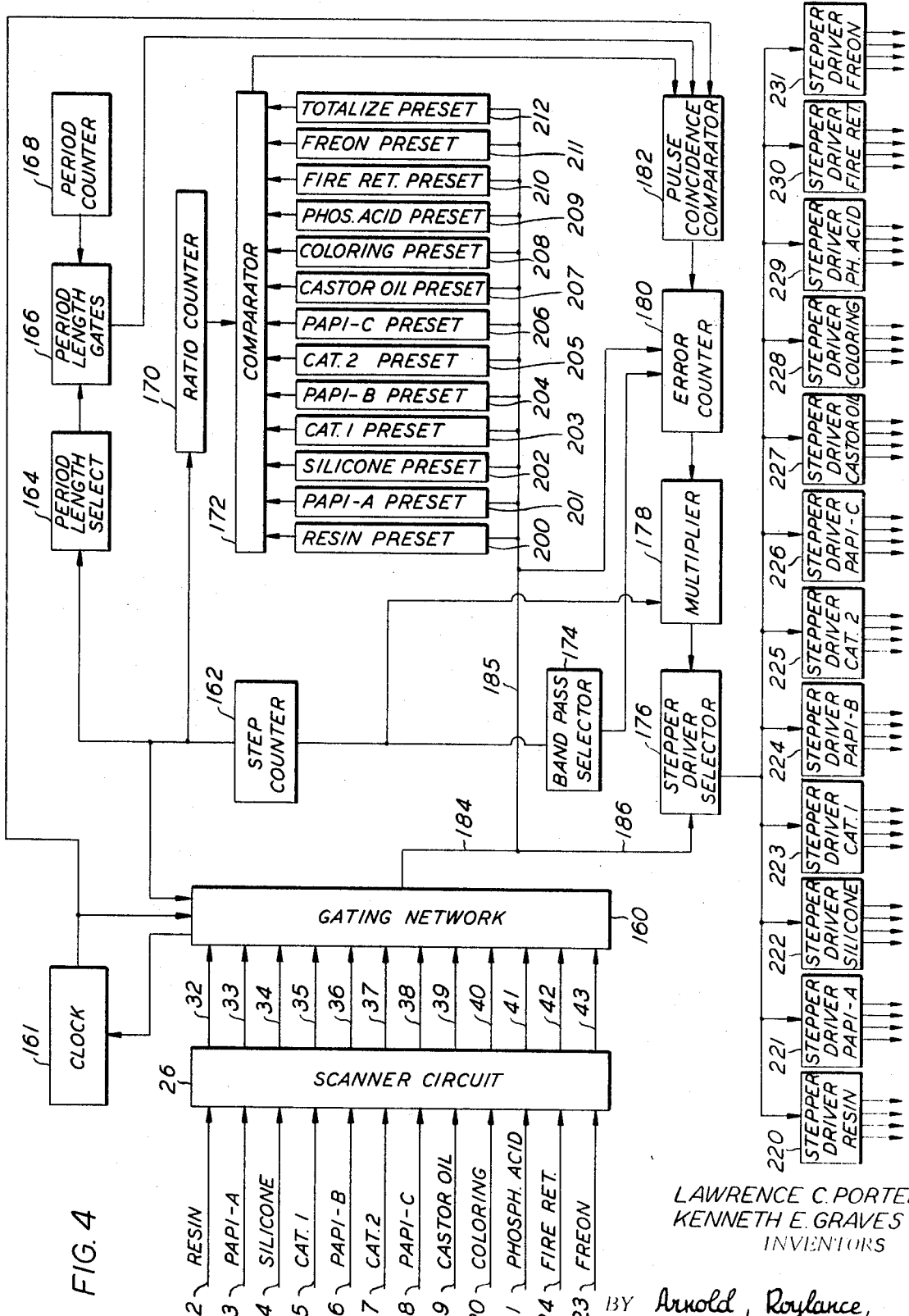
FIG. 4 is a functional representation of the major components in one embodiment of the controller depicted in FIG. 1.

The output signal 130 from the resin No. 2 holding register 70 functions as a NOT signal to each of the other output registers 91—101 and the strobe generator 142, as hereinbefore mentioned, for the purpose of blocking these circuits during the interval wherein resin transfer is being measured and applied to the controller circuit represented in FIG. 4. Similarly, the output signal 131 acts as a NOT signal to output registers 92—101, signal 132 as a NOT signal to output registers 93—101, and so forth, as may be seen in FIGS. 2A and 2B. On the other hand, as may further be seen, the strobe generator 142 operates only when all of the No. 2 holding registers 70—81 have been cleared. Thus, when the strobe generator 142 "fires," it simultaneously loads each of the No. 2 holding registers 70—81 with any new signal which may have been received in the corresponding ones of the No. 1 holding registers 50—61 during the time following the previous pulse generated by the strobe generator 142.

Thus, it may be seen that the various input mass flow measurements arriving in conductors 12—23 may be cyclically and continuously sampled, one after another, and that these samples are transferred by the scanner circuit 26 to the balance of the controller system or section as illustrated in FIG. 4. Each of the No. 1 holding registers 50—61 may include a Schmitt trigger (see FIG. 3) as a portion of its input circuitry, since it is convenient that the input signals arriving in conductors 12—23 be reshaped into substantially "square" or rectangular pulses whereby the leading edges of such pulses may be easily handled.

It is especially desireable that the scanner circuit 26 be capable of accepting a pulse into any of the No. 1 holding registers 50—61, and also clearing such pulse through such register before the next succeeding pulse is received by that register, or else the succeeding pulse will be lost from the measurement sought to be made. In other words, for a given clock rate there is always an inherent maximum or upper frequency limit which must be applied to the input signals appearing in conductors 12—23. Conversely, there is also a minimum clock frequency above which none of the pulses arriving in conductors 12—23 at less than the aforementioned maximum input frequency will be lost. Accordingly, the minimum clock frequency may, for purposes of the present invention, be defined as twice the sum of the maximum input frequency. Thus, if it is assumed there are 12 input circuits to the scanner circuit 26 as illustrated (see conductors 12—23), and if it is further assumed that eight of these inputs have preselected maximum frequencies of 50 kc., three have preselected maximums of 80 kc., and that one has a limit of 20 kc., the minimum acceptable clock frequency may be seen to be 1.32 mc.

It should be noted that the various measurement frequencies 12—23, which are suggested in FIG. 1, are asynchronous with respect to each other, and thus the pulses composing these frequencies will arrive at the controller 27 in a random manner. Hence, many of the pulses will arrive more or less coincidentally with one or more other pulses, and will be lost since they will tend to appear as a single pulse.

Accordingly, the primary purpose of the scanner circuit 26 is to accept each arriving pulse independently of the other arriving pulses, and to sort all selected pulses in a systematic manner whereby each pulse may be utilized by the controller 27. As explained with respect to FIGS. 2A and 2B, this may be achieved by providing an array of individual receiving and holding channels each of which receives and accumulates incoming pulses from its respective converter, and to further provide a system for interrogating each channel selectively and sequentially while holding the other channels in abeyance during such interrogation.

Figure 3:
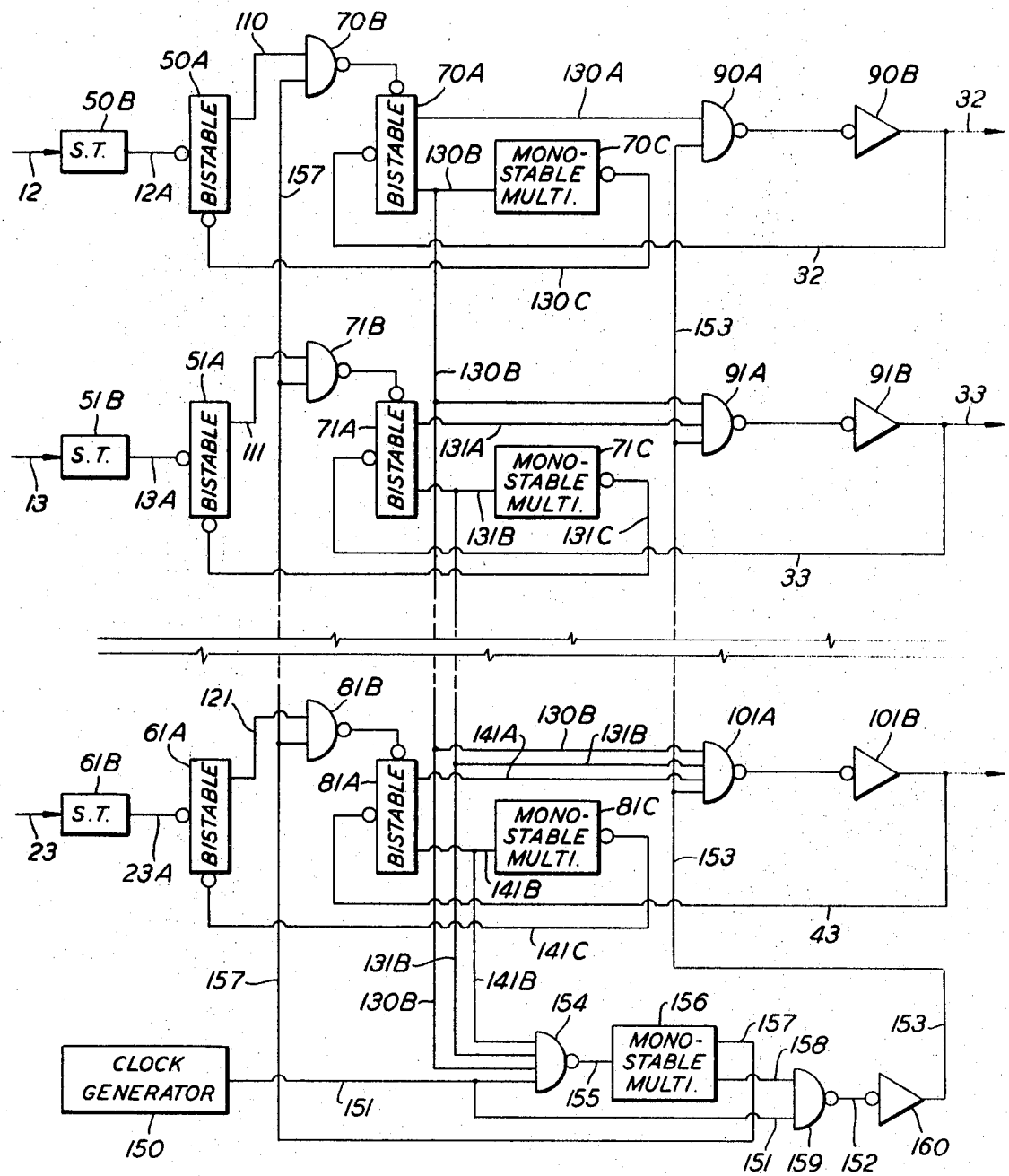
FIG. 3 is another functional representation of the scanner circuit depicted in FIGS. 2A and 2B.

Referring now to FIG. 3, there may be seen a more detailed but slightly modified illustration of the scanner circuit depicted in FIGS. 2A and 2B, except that the circuitry represented in FIG. 3 is depicted with only three representative channels 12, 13 and 23 instead of the 12 signals 12—23 illustrated in FIGS. 2A and 2B. As may be seen, each channel has a Schmitt trigger circuit in its input to square the incoming pulses to make them more compatible to digital circuitry. Each incoming squared pulse is applied to the low input terminal of a first bistable multivibrator circuit, which corresponds to the No. 1 holding register depicted in each channel illustrated in FIGS. 2A and 2B. The first multivibrator responds to the pulse by generating a voltage signal which is applied to one of the inputs of an AND gate having its output connected to the set input side of a second bistable multivibrator corresponding to the No. 2 holding register depicted in FIGS. 2A and 2B.

Referring more particularly to FIG. 3, the resin transfer rate pulses 12 may be seen to be applied to a conventional Schmitt trigger circuit 50B, which generates a corresponding frequency of squared pulses 12A into a bistable multivibrator 50A. Similarly, the PAPI-A transfer pulses 13 are applied to a Schmitt trigger 51B to produce squared pulses 13A into a bistable multivibrator 51A, and the freon transfer rate pulses 23 are applied to a Schmitt trigger circuit 61B to produce corresponding squared pulses 23A to a bistable multivibrator 61A.

Each of the bistable multivibrators 50A, 51A and 61A, function as the No. 1 holding registers 50, 51 and 61, respectively, as depicted in FIGS. 2A and 2B. More particularly, the leading edge of each of the squared pulses 12A will condition the multivibrator 50A, and the trailing edge will accordingly cause an output 110 into the AND gate 70B. When the monostable multivibrator 156 (see strobe generator 142) generates a signal 157, the AND gate 70B will cause the bistable multivibrator 70A (see the No. 2 holding register 70 in FIGS. 2A) to generate a signal 130A to the AND gate 90A, and to terminate the signal 130B into the monostable multivibrator 70C and to AND gates 154, 91A and 101A. Termination of signal 130B causes the monostable multivibrator 70C to generate a signal 130C to reset the first bistable multivibrator 50A, thus terminating the signal 110 into the AND gate 70B.

Similarly, the leading edge of each of the squared pulses 13A will condition the bistable multivibrator 51A, and each trailing edge will cause it to generate an output voltage 111 into the AND gate 71B. If the strobe signal 157 is then present, the AND gate 71B will generate a signal to cause signal 131A to appear and signal 131B to disappear. In the same manner, squared pulses 23A will cause signals 141A and B to appear and disappear.

As hereinbefore stated, AND gate 90A is enabled by signal 130A (and also signal 153). However, it may be seen that AND gate 91A requires the simultaneous presence of signals 131A and 130B (as well as signal 153), and AND gate 101A requires signals 130B, 131B and 141A, (as well as signal 153 and other signals not depicted). Accordingly, the timing signal 151 from the clock 150 cannot pass through the AND gate 154, and the monostable multivibrator 156 will generate signal 158 but not signal 157. Thus, the AND gate 159 is enabled to generate an output 152 which is inverted by the inverter 160, and passes as signal 153 the inputs of AND gates 90A, 91A and 101A. However, as hereinbefore stated, only AND gate 90A will be activated, and will generate an input to inverter 90B which, in turn, produces the output signal 32 into the controller 27 depicted in FIG. 1.

It may also be seen that signal 32 is also applied to bistable multivibrator 70A. Thus, when signal 153 disappears, AND gate 90A will close and signal 32 will disappear from bistable multivibrator 70A to terminate signal 130A and to reestablish signal 130B. This conditions monostable multivibrator 70C to generate an output pulse when signal 130B again terminates. However, signal 130B will enable AND gate 91A to establish signal 33 upon the next appearance of signal 153.

When bistable multivibrators 70A, 71A and 81A, have all been reset while producing signals 32, 33 and 43, respectively, AND gate 154 will simultaneously receive all of its enabling signals 131B, 141B, and 130B, respectively, and will allow the next appearing signal 151 to cause monostable multivibrator 156 to generate an enabling pulse 157 to AND gates 70B, 71B and 81B, respectively, as hereinbefore described, and also to terminate enabling signal 158. This, in turn, blocks signal 153 during the time bistable multivibrators 70A, 71A and 81A are accepting signals from AND gates 70B, 71B and 81B, respectively.

It is essentially the function of the controller circuitry as basically represented in FIG. 4 to derive a comparison between the desired input of each ingredient and the actual input, and to adjust the system so as to match the preselected formulation. In a useful embodiment of the controller circuitry, the system may be adapted to derive and utilize control signals representing the respective ratios of the actual input of each ingredient to the preselected input or throughput of such ingredients, and to thereafter adjust each such input to match the preselected input.

For example of a practical application of this technique, it will be noted that the aforementioned patent application Ser. No. 701,596, describes a process for manufacturing polyurethane foam. In such a process isotropicity of the foam is the most important of all of the various characteristics of the product, and this can only be achieved and maintained if the various material input rates are selected and held to a very close formulation. Thus, it is the function of the present invention to provide input rate control to maintain the isotropicity of the foam product during the operation of the system represented generally herein. Accordingly, the controller circuitry depicted in FIG. 4 is preferably adapted to receive preset values each representing the ratio of each ingredient to a preselected one ingredient (preferably resin), and thus to derive and compare the actual ratio of each ingredient to resin with the preset or preselected ratio. Thus, the controller circuitry will operate to maintain the desired formulation or proportionality within close tolerances to maintain optimum isotropicity, whereby total throughput can be adjusted without interruption of productivity.

Accordingly, it is a function of the step counter 162 to repetitively derive an appropriate number of (for example, 16) stepping signals, in a cyclic manner, for the purpose of causing the gating network 160 to accept and derive the ratios of selected ones of the input signals 32—43. For example, step one will derive the actual ratio of PAPI-A-to-resin input, step two will derive the actual ratio of silicone-to-resin input, step three will derive the actual ratio of catalyst No. 1-to-resin, and so forth through a sequence of nine of the 16 steps.

In each of these first nine steps, the gating network 160 transmits a signal (not shown in FIG. 4) representing the actual resin input to period counter 168, and a signal (not shown in FIG. 4) representing the actual input of the selected ingredient to the ratio counter 170. The period counter 168, in turn, delivers a signal to the comparator circuit 172 representing the base number of the ratio of the selected ingredient to resin. Thus the period counter 168 will transmit a control pulse to the comparator 172, coincident with the acquisition of (for example) 1000 "resin" pulses in the period counter 168.

In addition, the gating network 160 also actuates the appropriate one of the presets 200—211 which, in turn, also applies a signal to the comparator 172 representing the preselected ratio of the input of the selected ingredient to resin input. The comparator 172 then transmits an output signal representing the comparison of these two ratio signals to the pulse coincidence comparator 182.

As may be seen in FIG. 4, it is necessary to obtain close synchronization of the various signals so as not to omit any pulses, and so that the periods of the signals are the same. Accordingly, the step counter 162 may be seen to actuate a period length select circuit 164 and a band-pass selector 174 at the same time it actuates the gating network 160 and the ratio counter 170. The period length select circuit 164 actuates the period length gates 166 which, in conjunction with the period counter 168, controls the pulse coincidence comparator 182 as will hereinafter be explained.

The pulse coincidence comparator 182, which is also controlled by the clock 161, transmits a signal to the error counter 180 which is representative of the difference or error (and the direction of such error) between the actual and the preselected ratios of the selected ingredient input to resin input, and the error counter 180, in turn, generates an output representative of the magnitude of the error. The band-pass selector circuit 174 is preferably included, as may be seen, to limit any error output to those of at least a minimum magnitude, so as to keep the system from responding to mere statistical differences and to keep "hunting" to a minimum.

The error signals from the error counter 180 are preferably passed through a multiplier 178, which will hereinafter be explained and described in detail, to a stepper driver selector circuit 176 which is also controlled by the step counter 162 through the gating network 160. The stepper driver selector 176, in turn, selects the appropriate one of the stepper drivers 220—231, and actuates it in a manner to appropriately adjust or position the appropriate one of the bidirectional stepper motors illustrated in the copending patent application Ser. No. 701,596, filed Jan. 30, 1968.

Referring again to FIG. 4, it may be seen that a resin preset 200 has been provided notwithstanding that the ratio of resin-to-resin in both the actual material throughput and the selected formulation will always be unity and thus meaningless for control purposes. It is often desirable to include graphic recording equipment with equipment of this character, however, and in such instances it is useful to record resin as well as the other ingredients so that the record will not be confusing. Alternatively, in those forms of the controller circuitry wherein the comparator 172 is connected to receive and to compare actual and preselected mass transfer rates, the presets 200—211 will be adjusted or set to deliver signals representing preselected transfer rates rather than ratios, and in such a case the resin preset 200 is an essential component. It should be understood, however, that foam systems of the type represented herein are required to be operated by relatively unskilled or only semiskilled personnel. Hence, the values actually turned into the presets 200—211 are preferably the preselected ratios of the input of each ingredient to resin input, as well as the desired total system mass transfer rate.

Referring again to the step counter 162, which has been assumed to generate 16 stepping signals during a cycle, it may be noted that step 12 may be utilized to derive a comparison of the actual total material throughput to the preselected total throughput. In such a case, the gating network 160 simultaneously accepts all of the ingredient input signals 32—43 and transmits a representation of these inputs to the ratio counter 170, which is a conventional binary decimal counter and which thus transmits to the comparator 172 a signal representing the sum of the inputs represented by signals 32—43. In addition, a totalize preset 212 is selected which applies a signal to the comparator 172 representing the preselected total material throughput. During the totalize step, the period counter 168 functions to determine the preselected period of time during which the scanner 26 operates in cyclically accumulating pulses from the inputs 12—23. On completion of the sample period the scanner 26 "turns off." Thus the totalize function has a definite time base.

Any error signal generated by the error counter 180 during step 12 is conducted to the stepper driver selector 176 as hereinbefore explained. However, in this instance, the stepper driver selector 176 will select and actuate the resin stepper driver 220 (or whichever stepper driver corresponds to the ingredient which has been chosen as the base ingredient for the various ratios hereinbefore described).

Figure 5:
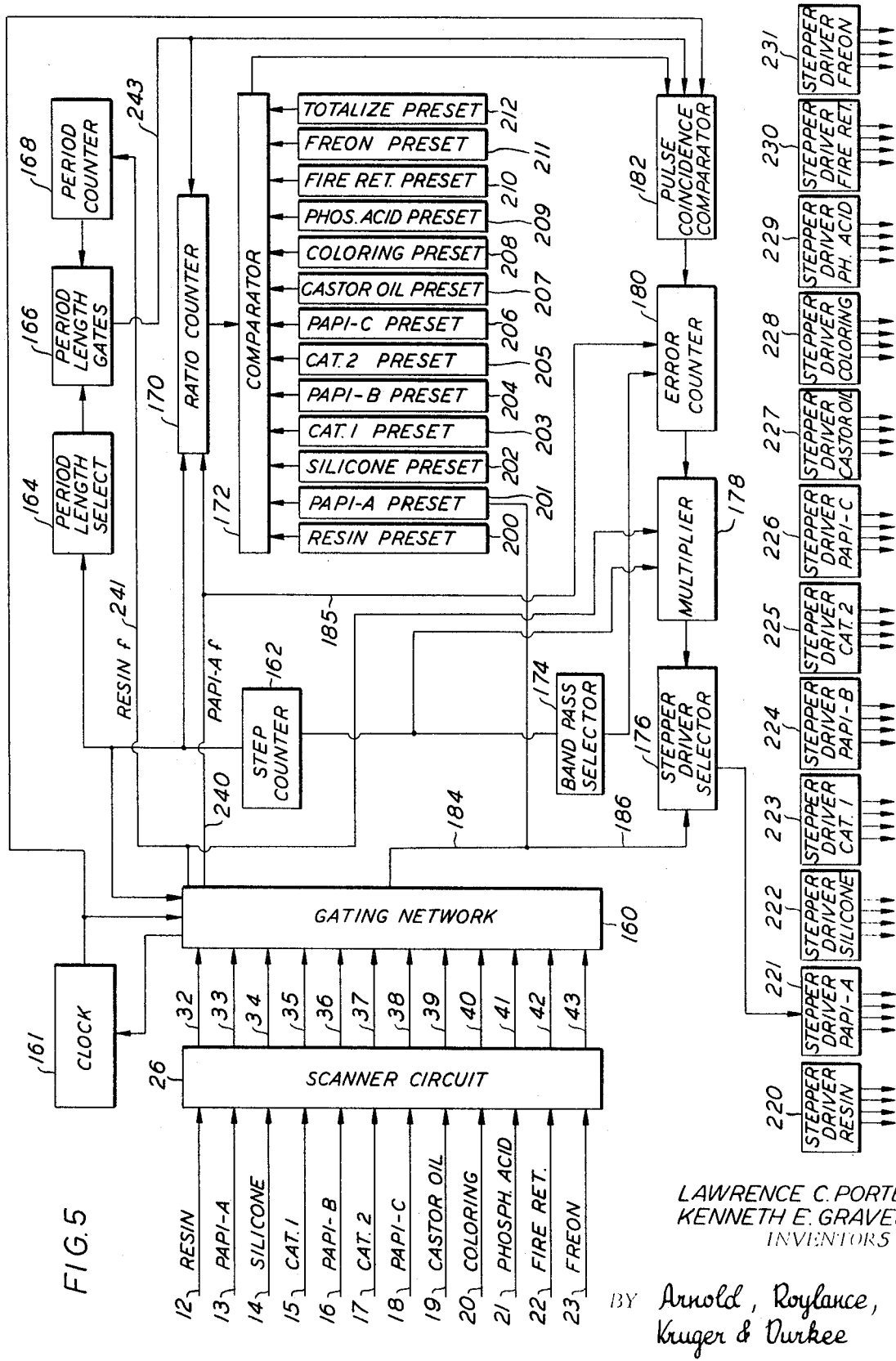
FIG. 5 is a functional representation of the controller depicted in FIG. 4 during one mode of operation.

Referring now to FIG. 5, there may be seen a representation of the controller circuit depicted in FIG. 4, when that circuit is in the step one mode for taking the ratio of PAPI-A to resin. Assuming that the step counter 162 has generated the signal representing or establishing step one, as hereinbefore described, the gating network 160 may be seen to deliver a pulse train 241 to the period counter 168 representing actual resin throughput, and a pulse train 240 to the ratio counter 170 representing actual PAPI-A throughput. The pulse train 241 representing resin throughput may also be seen to be applied to the multiplier 178, as will hereinafter be explained.

The period counter 168, in turn, generates an output signal representing the acquisition of a predetermined number of resin pulses (generally one thousand) and applies this signal to the pulse coincidence comparator 182 by way of the period length gates 166. The gating network 160 and step counter 162 having selected and activated the PAPI-A preset 201, the comparator 172 will accordingly derive a signal representative of the comparison of the actual ratio of the resin and PAPI-A inputs to the preselected ratio thereof, and will apply this signal to the pulse coincidence comparator 182, as hereinbefore described, and the PAPI-A stepper driver 221 will be selected if the measured error (if any) is large enough to require adjustment of PAPI-A throughput.

It should be understood that the pulse coincidence comparator 182 is essentially an OR circuit with respect to the signals received from the period length gates 166 and the comparator 172. If the signal delivered to the pulse coincident comparator 182 from the comparator 172 is received at the same time as the signal from the period length gates 166, the pulse coincidence comparator 182 will not produce an output to the error counter 180. However, if the signal from the comparator 172 arrives at a time different from that of the signal from the period length gates 166, then the pulse coincidence comparator 182 will generate an error control signal having a magnitude proportional to the ratio error, and having a polarity dependent upon whether the signal from the comparator 172 has arrived earlier or later than the signal from the period length gates 166.

The error control signal from the pulse coincidence comparator 182 causes the error counter 180 to determine the PAPI-A error, as hereinbefore stated. However, to reduce "hunting," the step counter 162 also causes the band-pass selector 174 to apply a limit of predetermined magnitude to the error counter 180. Thus, if the compute "error" is within the limit, the error counter 180 will generate no output signal. On the other hand, if the error is greater than the preselected limit, the entire computed error signal (not merely the excess) will pass to the multiplier 178.

As hereinbefore stated, it is desirable to control the total material throughput rate as well as the mass transfer rate of each of the various components of the formulation. However, the pulses in the output signals 12—23 from the various pump measurement devices such as the converter 9 depicted in FIG. 1, do not necessarily each represent the same amount of material transferred during a particular time interval. For example, each pulse in the resin rate signal 12 may represent 1/100 of a pound per second (for example) whereas each pulse in the Cat. 1 rate signal 15 may represent 1/10,000 of a pound per second. Accordingly, the pulses in the various signals 12—23 may not be accumulated indiscriminately in determining total mass transfer rate, but must be accumulated in proportion to each other.

When the pulses in a particular rate signal are counted, they may be fed into counter 170 without regard for their relative weight with respect to the pulses in the other rate signals, since the stages 170A—E in the counter 170 are only concerned with the pulses in one signal. In totalizing, however, the pulses are preferably fed directly into selected stages of the counter 170, as will be explained, according to their weight relative the respective weights of the pulses in each of the other rate signals.

Figure 6:
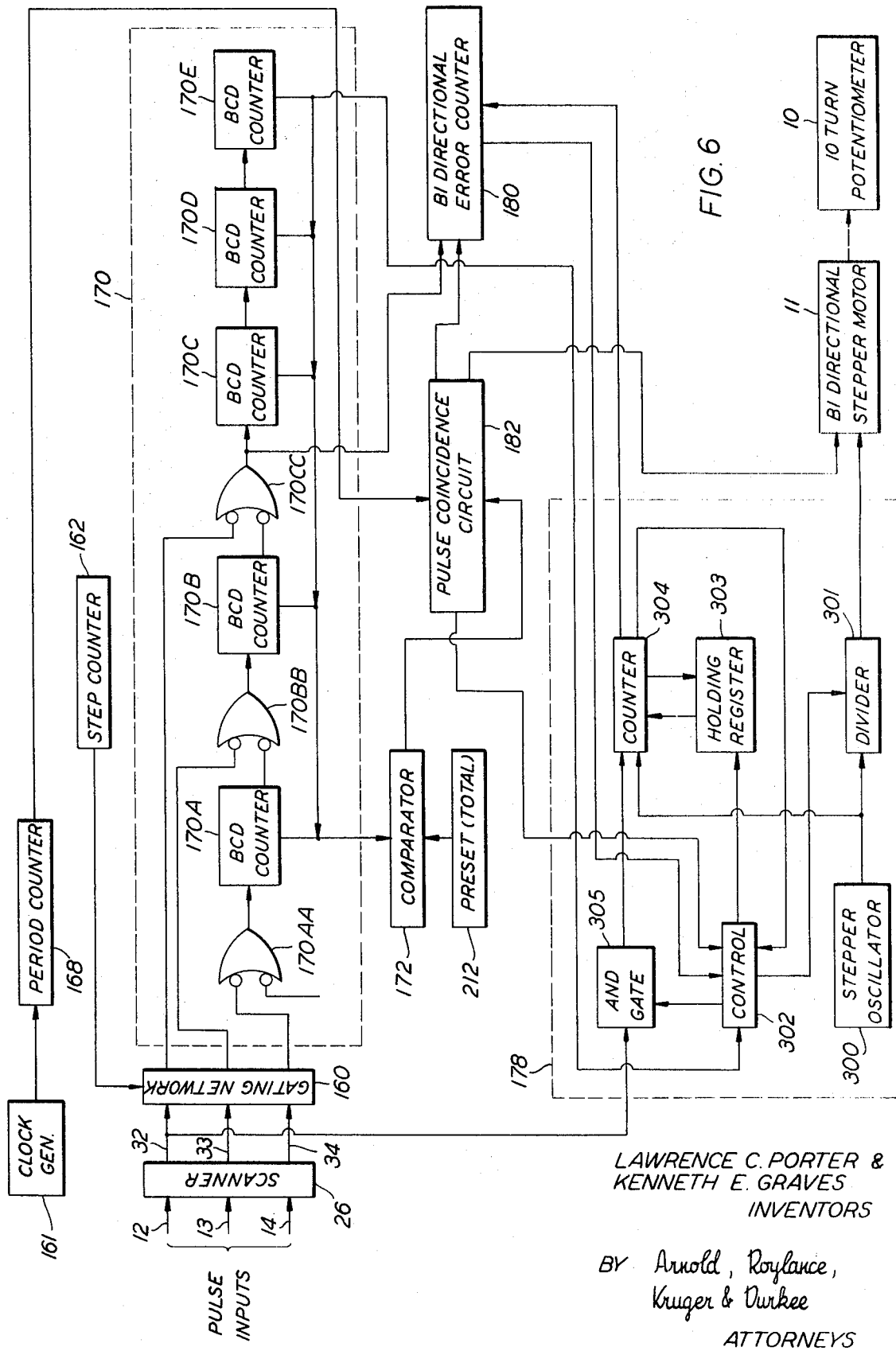
FIG. 6 is a functional representation of the controller depicted in FIGS. 4 and 5 during another different mode of operation.

Referring now to FIG. 6, there may be seen a simplified representation of the system depicted in FIGS. 4 and 5, but wherein selected portions of the system are illustrated in greater functional detail. More particularly, the step counter 162 applies a command signal to the gating network 160 to open all channels 32—43 (see FIGS. 4—5) simultaneously from the scanner 26 into the ratio counter 170. However, as hereinbefore stated, each of these channels 32—43 is connected into a selected one of the different stages 170A—E of the counter 170. As may be seen in FIG. 6, the counter 170 may be a conventional binary coded decimal counter having five or more stages 170A—E. Stages 170A and 270B are adjusted to receive pulses representing 1/10,000 and 1/1,000 of a pound per second pulses, respectively, and stages 170C and 170D to receive 1/100 and 1/10 of a pound per second pulses, respectively. Stage 170E is connected to receive and register pulses representing 1 pound per second, and other stages (not depicted) may be included to further total the pulses accumulated in stages 170A—E.

Accordingly, the resin rate transfer signal 12 entering the scanner 26, and composed of pulses representing 1/100 of a pound of resin per second, is applied through an OR gate 170CC to stage 170C of the counter 170, and the PAPI-A rate pulses 33 which may represent 1/1,000 of a pound of material per second are applied through another OR gate 170BB to stage 170B thereof. For simplicity, the only other rate signal illustrated is the silicone rate signal 34. However, it should be clearly understood that each of the other signals not depicted in FIG. 6 is also connected to an appropriate one of the various OR gates 170AA—CC in the stages 170A—C of the counter 170, and the total of all of the various pulses being accumulated is derived by outputs from the stages 170A—E as a signal into the comparator 172. The totalize preset 212 may be seen to be connected to the other side of the comparator 172, and when the total pulses from the counter 170 equal the value established by the preset 212, the comparator 172 generates an indicating signal or pulse into the pulse coincidence (preferably anticoincidence) circuit 182.

As may also be seen, the clock 161 is generating a suitable (e.g., 1 kc.) time base frequency signal into the period counter 168, and at the end of a preselected time interval such as one second, the period counter 168 generates an indicating pulse to the other side of the coincidence or anticoincidence circuit 182. If the two pulses into the anticoincidence circuit 182 arrive simultaneously, this will indicate that the actual total mass transfer rate is equal to the preset total mass transfer rate, and the coincidence or anticoincidence circuit 182 will not produce any output signal into the bidirectional error counter 180. On the other hand, if one pulse arrives ahead of the other, the anticoincidence circuit 182 will produce a pulse (the polarity of which will preferably indicate the identity of the earlier of the two pulses) to start the bidirectional counter 180 running in the direction (plus or minus) in which the error has occurred to count pulses from the counter 170.

Previously, it was necessary to correct or multiply the number of pulses accumulated in the error counter 180 because the time base of the sample period did not necessarily correspond to the time base of the measurement frequency. In the totalizing step, this is not necessary since the time base of the sample period and each of the measurement frequencies 12—23 is 1 second. However, it is preferable to adjust only the base material transfer rate when correcting for errors in total throughout rate, as hereinbefore stated, and thus it is preferable to accumulate error pulses in the error counter 180 which have the same proportional weight as the resin rate pulses 12. Accordingly, the first output signal from the anticoincidence circuit 182 causes the bidirectional error counter 180 to begin receiving pulses from the OR gate 170CC leading into stage 170C of the ratio counter 170, and to stop upon the receipt of the second pulse from the anticoincidence circuit 182.

Only a portion of the 1/100 of a pound per second pulses accumulated in the error counter 180 are attributable to resin rate pulses 12. Thus, it is necessary to determine the percentage of the error which is proportionate to resin, and this is accomplished by the multiplier 178 depicted in FIGS. 4 and 5.

Referring again to FIG. 6, it may be seen that the output of stage 170E of the ratio counter 170 is connected through a control circuit 302 to holding register 303. The AND gate 305, which is also connected to receive the resin rate pulses 32 from the scanner 26, is enabled by the control circuit 302 to pass these pulses into the counter 304 until a control pulse from stage 170E, representing the accumulation of 10 pounds, reaches the control circuit 302. The AND gate 305 then closes, and contents of the counter 304 are then transferred to the holding register 303. This count which is now held in the holding register 303 will be seen to be the ratio of the number of resin rate pulses 32 to each 10 pounds of total material throughput per second, and will be less than unity.

When the anticoincidence circuit 182 generates the second stopping pulse to the error counter 180, it may simultaneously generate a command signal to the control circuit 302 to cause it, in turn, to transfer the complement of the count then in the holding register 303 back into the counter 304. The stepper oscillator 300 is continually generating a fixed frequency to the divider 301 and to the counter 304. The control circuit 302 now opens the divider 301 and also the counter 304, and the oscillator frequency now counts up the counter 304 to unity, whereupon the counter 304 generates a signal reducing the counts then in the error counter 180 by one count. The cycle is then repeated, until the error counter 180 is returned to zero.

Simultaneously, pulses from the divider 301 may be applied to the stepper motor 11 to turn the potentiometer 10, associated with resin control, in a direction which may be determined by an appropriate signal from the anticoincidence circuit 182 depending on the identity of the first arriving pulse.

Figure 7:
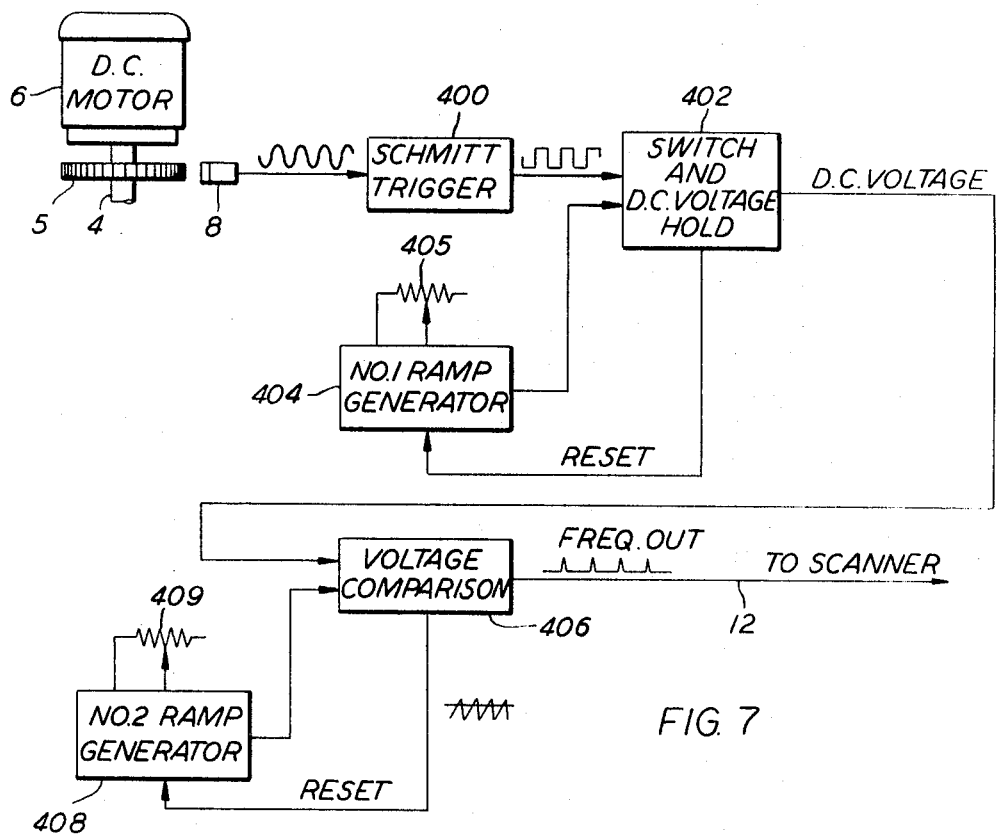
FIG. 7 is a functional representation of the operating concept of an exemplary form of the converter portion of the system depicted in FIG. 1.

It will be apparent from the foregoing that a significant feature of the present invention is the fact that the indicator or measurement signals, which are delivered to the scanner circuit 26, are directly related to mass transfer rates, and are therefore readily comprehended by unskilled or semiskilled operating personnel. Referring now to FIG. 7, there may be seen a more detailed functional representation of a typical one of the various indicator circuits in the system depicted in the aforesaid patent application Ser. No. 701,596, and such as the circuit generally represented in FIG. 1 herein. In particular, there is shown (for example) the DC motor 6 and spur gear 5 hereinbefore described for driving a pump 2 together with the magnetic pickup 8 shown in FIG. 1. As previously explained, the spur gear 5 is provided with 60 equally spaced-apart and magnetically tipped teeth which rotate past the magnetic pickup 8 in functional relationship to the flow of resin. Thus, a 1-second period sampling of the output signal from the magnetic pickup 8 will reflect the r.p.m. of the DC motor 6. Furthermore, since the amplitude of the output signal is related to the proximity of the particular tooth to the magnetic pickup 8 at any one instant, it will be apparent that the output signal reaches the frequency-to-frequency converter 9 (see FIG. 1) in the form of train of oscillations the period of which is related to the rotational velocity of the spur gear 5.

Referring again to FIG. 7, it will be seen that one advantageous form of the frequency-to-frequency converter 9 includes a Schmitt trigger circuit 400 which responds to the oscillations emitted by the magnetic pickup 8 by generating a functionally related square wave DC output signal which is relatively quite linear. As may also be seen, a switch and DC voltage hold circuit 402 is provided which is responsive to the square wave DC signal from the trigger circuit 400, and which is also responsive to a monotonic output signal being produced by a No. 1 ramp generator 404 having a slope adjustment 405. Essentially, the monotonic signal from the No. 1 ramp generator serves to charge a capacitor in the switch and DC voltage hold circuit 402 at a rate determined by the position of the slope adjustment 405. The arrival of a preselected portion of the square wave signal (usually the leading edge of each square wave) may be caused to begin the accumulation of charge by the capacitor, and discharge may be caused by the arrival of the trailing edge of each square wave. Alternately, each leading edge of the square wave signals may be used both to discharge the capacitor and to initiate accumulation of the next succeeding charge in the sequence. In either event, discharge also acts as a reset signal to the No. 1 ramp generator 404. The ramp amplitude is a function of the square wave period. The peak ramp amplitude may be held in the DC hold circuit 402 after the reset of the No. 1 ramp generator 404.

The DC output signal from the switch and DC voltage hold circuit 402 may be seen to be applied to the input side of a voltage comparator circuit 406 which is also responsive to a ramp voltage signal from a No. 2 ramp generator 408. The No. 1 ramp generator will be reset each time the ramp voltage equals the DC voltage from the DC hold circuit 402. Thus, the output signal from the voltage comparator circuit 406 is a series of pulse peaks which are directly indicative of each preselected unit of fluid being transferred by the operation of the pump 2. Within the limits of capacitor size, etc., the r.p.m. signal from the DC motor 6 can be adjusted to deliver pulses at any desired rate to the scanner circuit 26, by way of conductor 12, to give the operator the most suitable indication of fluid transfer, since the No. 2 ramp generator 408 is also preferably provided with a similar slope adjustment 409. Accordingly, the pulse peaks in conductor 12 may be made directly indicative of pounds of fluid per minute, gallons per hour, or any other relationship which may be desired, and this signal or measurement may be delivered directly to the scanner circuit 26.

Referring again to FIG. 5 and to the multiplier 178 illustrated therein, it will be apparent that the controller system is preferably intended to receive and respond to indicator signals arriving at a very high frequency, and that is is accordingly further desirable for obtaining maximum control resolution that the controller system "see" as many indicator pulses as possible during any preselected measurement period. As hereinbefore stated, the frequency of each of the signals arriving in conductors 12—23 is "weighted" to be functionally representative of the mass transfer rate of the particular fluid component associated with that signal, and is further an explicit function of time. For example, an input pulse frequency of 7,562 pulses per second in conductor 12 may signify a mass transfer rate of 75.62 pounds of resin per minute.

When the controller system operates to provide a measurement of the ratio of PAPI-A to resin, as hereinbefore explained, it will be apparent that any error signal in the error counter 180 will be representative of the ratio error of the ratio of PAPI-A mass transfer rate with respect to a preselected base rate of resin mass transfer, and that the error is therefore an implicit function of time. Moreover, it will also be apparent that the same ratio or ratio error may exist for any number of different pairs of frequencies.

As may be seen, it is desirable to actuate a particular one of the bidirectional stepper motors, illustrated in the copending Pat. application Ser. No. 701,596, to achieve an exact mass transfer rate correction for the particular fluid component to eliminate the error so detected and measured. Accordingly, it is desirable to convert ration error to mass transfer rate error, and the multiplier 178 is provided for the purpose of multiplying the ratio error by a factor representative of or functionally related to the ratio of the base component (resin) mass transfer rate frequency with respect to the base component (resin) period base number. For example, if the resin throughput rate is 75.62 pounds per minute, a frequency signal of 7,562 pulses per second will be applied to the period counter 168, and if the period length gates 166 are preprogrammed for a period of 1000 pulses of base (resin) material, the period base number will be 1000. Thus, the ratio-to-mass transfer rate correction factor will be 7562 1000, or 7.562.

As previously explained in connection with FIG. 6, when a "totalize" measurement is made of the total mass transfer rate, the error signal in the error counter 180 is a direct functional representation of the total mass transfer error, and this signal is therefore an explicit function of time. Although such a signal may be used for correctional purposes, it will be apparent that it is representative of the sum of all of the individual fluid mass transfer rate errors and cannot, therefore, be used to adjust the transfer rate of any particular fluid component.

Assuming that resin has been selected as the master or base component, as hereinbefore stated, it will be apparent that it is necessary to correct an error in the total material throughput rate by adjusting the rate of resin mass transfer. However, this is achieved by means of the resin bidirectional stepper motor 11, and thus it is necessary to determine the exact number of error pulses to apply to the resin stepper driver 220. Accordingly, in the system illustrated in FIG. 5, this is achieved by determining the ratio of the resin mass transfer rate with respect to the total mass transfer rate and by multiplying the total error held in the error counter 180 by a factor representative of the resin mass transfer rate divided by the total error, which factor will obviously never be greater than unity.

Thus, it will be apparent that the multiplier circuit 178 is provided for the purpose of sampling the incoming resin (or other base component) mass transfer rate frequency, for deriving the appropriate "error multiplier" factor, and for converting the error count held in the error counter 180 into a pulse train definitive in number of the number of mass transfer rate units of error sought to be corrected with respect to the resin pumping system. As may be further seen in FIG. 5, this pulse train is applied through the stepper driver selector circuit 176 to the appropriate stepper driver.

Figure 8:
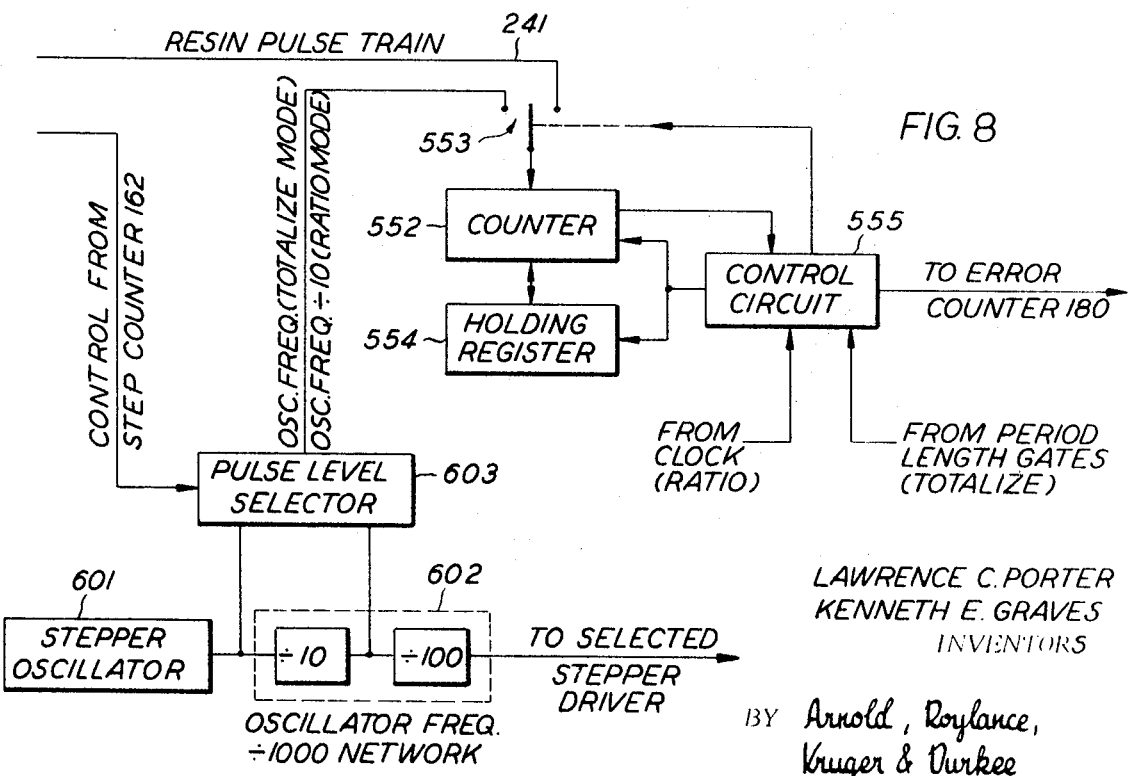
FIG. 8 is a functional representation of the operating concept of an exemplary form of the multiplier portion of the controller depicted in FIGS. 4—6.

Referring now to FIG. 8, there may be seen a functional representation of the basic components in the multiplier 178, which components are arranged and adapted to count the number of resin pulses (for example) being received during the sampling period. In particular, there is provided a binary decimal counter 552 connected to receive either the resin pulse train from conductor 241 (see FIG. 5), or the pulse train from a stepper control oscillator 601 through a pulse level selector 603, depending on the position of the switch 553 which is actuated by the control circuit 555 in response to the clock 161 illustrated in FIG. 5. If it is assumed that the clock 161 generates a period signal of 0.1 second, when the controller system is in the ratio mode, the switch 553 will admit the resin pulse train to the counter 552 during that interval. At the end of the 0.1 sampling period, the accumulated total in the counter 552 is transferred to a holding register 554, the counter 552 is cleared, and the complement of the accumulated total is transferred back to the counter 552 without clearing the holding register 554. The switch 553 shifts to admit the pulse train from the pulse level selector 603.

As may be seen in FIG. 8, the stepper oscillator 601 is arranged to generate a pulse train which passes to a dividing network 602 containing a divide-by-10 stage and a divide-by-100 stage respectively and sequentially arranged therein. Accordingly, the pulse train from the stepper oscillator 601 is initially divided by 10 during the ratio control mode multiplier function, as provided by the pulse level selector 603 (which is controlled by the step counter 162) gating the pulse train after it passes through the divide-by-10 stage. The counter 552 is counted until it contains the maximum possible number of "ones," whereupon the counter 552 "overflows" on the next received pulse to generate a "carry" pulse to the error counter 180 and to thereby reduce the error count held in the error counter 180 by "one." As may be seen, each time a "carry" pulse is generated by the control circuit 555, the multiplier counter 552 is reloaded with the accumulated signal in the holding register 554.

This cycle is repeated until the error count held in the error counter 180 is reduced to zero, whereupon the stepper oscillator 601 is inactivated. During the entire cycle, however, in which the ratio error is being counted out of the error counter 180, the stepper oscillator 601 generates a train of pulses which passes through the dividing network 602 to the selected one of the stepper drivers 220—231, causing the associated bidirectional stepper motor to properly adjust its associated 10-turn control potentiometer and to thereby adjust the associated SCR controller or servo amplifier accordingly.

It will be apparent that is is desirable that the frequency range of the stepper oscillator 601 be many times greater than the operating ranges of the various stepper motors sought to be controlled. For example, the frequency of the stepper oscillator 601 may be selectively adjustable through a range which is 1,000 times greater than that through which the bidirectional stepper motors may operate and track discretely.

During the totalize operating mode of the controller system, the function of the multiplier 178 may be essentially the same as hereinbefore explained. However, during the totalize mode the control circuit 555 will preferably receive its control signal from the period length gates 166, causing the switch 553 to admit resin pulses in conductor 241 to the counter 552 for a period equal to 1,000 pulses of the totalize frequency accumulated in the period counter 168, by the scanner circuit 26, in the manner hereinbefore described. Accordingly, the pulse level selector 603 will apply the undivided output frequency from the stepper oscillator 601 directly to the counter 552, instead of passing it first through the dividing network 602 as hereinbefore described.

The counter 552 may be of any suitable size, depending upon the input frequencies expected to be accommodated. For example, if the counter 552 is 12 "bits" long, it can accumulate a total count of 4096, and thus can keep track of a frequency input on conductor 241 of up to a maximum of 40.96 kc.

As hereinbefore stated, the controller system is adapted to sample through any desired number of stages, and in the system disclosed in FIG. 5, the step counter 162 cycles the gating network 160 through 16 stages. Stages Nos. 1—11 include those stages wherein the ratios of the flow rates of each of the various ingredients with respect to a preselected ingredient are sampled, and stage No. 12 involves sampling the total rate of material throughput. Stages Nos. 13—16 may be used for sampling the ratios of any other ingredients not heretofore mentioned, in those instances wherein a different formulation may be desired, or for the measurement and/or adjustment of other system parameters.

It should be noted that although the present invention has been described primarily with respect to material blending operations, such as those described in the aforementioned Pat. application Ser. No. 701,596, the invention clearly has a broad range of uses. Generally, the invention is intended for any purpose wherein a plurality of unstable system parameters are to be maintained according to a preselected relationship or formulation.

Many modifications and variations besides those specifically mentioned may be made in the techniques and structures described herein and depicted in the accompanying drawings without departing substantially from the concept of the present invention. Accordingly, it should be clearly understood that the forms of the invention described and illustrated herein are exemplary only, and are not intended as limitations on the scope of the present invention.

What I claim is:

1. Controller apparatus for maintaining a plurality of potentially unstable parameters according to a preselected functional relationship comprising indicating means for generally indicating the magnitude of each of said parameters, frequency means for deriving an input frequency each functionally related to a different one of said functionally indicated magnitudes, preset means for establishing a plurality of preset functions each representative of a preselected magnitude of a different one of said parameters according to said preselected relationship, comparison means for deriving the functional difference between corresponding ones of said indicated and preset magnitudes, and adjustment means for deriving from said functional difference an output composed of digital units functionally related in terms to corresponding units of the corresponding parameter.

2. The controller apparatus described in claim 1, wherein said output from said adjustment means is composed of digital units functionally related in number to said derived functional difference.

3. The controller apparatus described in claim 2, wherein each of said input frequencies is representative in terms of rate units of preselected magnitude of the corresponding ones of said parameters, and wherein said output from said adjustment means is composed of digital units functionally related in number to the difference between said corresponding ones of said indicated and preset magnitudes as expressed in terms of said rate units.

4. The controller apparatus described in claim 3, wherein said input frequencies are generally representative in terms of units of mass transfer rate, and wherein said output from said adjustment means is composed of digital units functionally related in number to the difference in number of said mass transfer rate units between said indicated and preset magnitudes.

5. The controller apparatus described in claim 4, wherein each of said digital units of said output is functionally representative of one of said mass transfer rate units.

6. The controller apparatus described in claim 5, wherein said adjustment means includes a multiplier for multiplying a determined number of pulses by a function of one of said input frequencies.

7. The controller apparatus described in claim 6, wherein said multiplier comprises timing means for defining a discrete time interval, sampling means responsive to one of said input frequencies for determining the number of pulses occurring in said input frequency during said time interval, and multiplying means deriving the product of said number of input frequency pulses and said determined number of pulses.

8. The controller apparatus described in claim 7, wherein said product corresponds in number of pulses to the number of said mass transfer rate in said difference between said indicated and preset magnitudes.

9. The controller apparatus described in claim 8, wherein said indicating and frequency means comprise frequency conversion means including first generating means for generating a first input frequency generally indicating the magnitude of each of said parameters, timing means for establishing a time dependent signal functionally related to said first input frequency, control means generating a control signal functionally related to a preselected time interval, and second generating means for transmitting to said comparison means a second input frequency functionally related to the mass transfer rate of the corresponding one of said parameters.

10. The frequency conversion means described in claim 9, wherein said second input frequency has a period functionally corresponding to said preselected time interval.

11. The controller apparatus described in claim 10, wherein said comparison means includes scanning means for receiving and sorting the pulses in each of said second input frequencies functionally relating in terms of mass transfer units to one of said parameters.

12. The scanning means described in claim 11, comprising a plurality of input channels each connected to receive and hold the pulses in one of said second input frequencies independently of the occurrence of the pulses in the other of said input frequencies, and sampling means for selectively taking said held pulses from said channels.

13. The scanning means described in claim 12, wherein said sampling means takes said held pulses from said channels in a time dependent manner.

14. The scanning means described in claim 13, wherein said sampling means sequentially selects said channels and takes said held pulses therefrom in a time dependent manner.

15. The scanning means described in claim 14, wherein each of said channels comprises a first holding for receiving and holding pulses in one of said second input frequencies, a second holding register for receiving and holding said pulses held by said holding register, and an output register for receiving and transmitting said pulses held by said second holding register in a time dependent manner.

16. The comparison means described in claim 15, further including
a step signal generator for generating a step signal to select pulses transmitted by a preselected one of said output registers in said scanner.

17. The comparison means described in claim 16, wherein said step signal selects pulses transmitted by both said preselected output register and at least one of said other output registers.

18. The comparison means described in claim 17, further comprising
comparing means for comparing a function of said selected pulses with respect to a corresponding one of said preset functions.

19. The comparison means described in claim 18, wherein said comparing means compares a function of said pulses transmitted by all of said output registers during a preselected time interval with respect to a preselected preset function.

20. The controller apparatus described in claim 19, wherein said product from said multiplying means corresponds in number of pulses to the number of mass transfer rate units in the difference between said preselected preset function and the mass transfer rate functionally represented by the frequency of the pulses received by a preselected first holding register.

21. A method of maintaining a plurality of potentially unstable parameters according to a preselected functional relationship, comprising
generating a plurality of electrical pulse trains each generally representative of the magnitude of one of said parameters,
generating a plurality of input electrical pulse trains each functionally related to one of said indicated magnitudes,
providing a plurality of preset electrical functions each representative of a preselected magnitude of a different one of said parameters according to said preselected relationship,
generating the functional difference between corresponding ones of said input electrical pulse trains and preset electrical functions, and
generating from said functional difference an output electrical signal composed of digital units functionally related in terms to corresponding units of the corresponding parameter.

22. The method described in claim 21, wherein each of said input electrical pulse trains is representative in terms of rate units of preselected magnitude of the corresponding ones of said parameters, and wherein said output electrical signal derived from said functional difference is composed of digital units functionally related in number to the difference between corresponding ones of said input electrical pulse trains and preset electrical functions as expressed in terms of said rate units.

23. The method described in claim 22, wherein said method further includes the step of multiplying a determined number of said units by a function of one of said input electrical pulse trains.

24. The method described in claim 21, wherein said digital units correspond to units of mass transfer.

25. The method described in claim 21, and further including, after generating a plurality of electrical pulse trains, the step of receiving and sorting the pulses in each of said input electrical pulse trains.

26. The method described in claim 25, and further comprising the step of receiving said pulses in each of said input electrical pulse trains independently of the occurrence of the pulses in the other of said input electrical pulse trains.

27. A controller for a system having a plurality of input parameters, comprising
input means for receiving pulses representative of units of said parameters of a system and for forming said received pulses into a plurality of pulse trains each representative in frequency to the said units for a selected one of said parameters,
preset means for establishing a plurality of predetermined ratio values between a base parameter and the other parameters, and
means for comparing each of said predetermined ratio values with the ratio of different selected ones of said pulse trains to a base parameter pulse train during a defined time interval and for deriving control pulses functionally related in number to any difference therebetween.

28. The apparatus of claim 27 wherein said defined time interval is defined by a preselected number of pulses of said base parameter and further including means for multiplying said control pulses by a function of said predetermined number of pulses.

29. The apparatus of claim 28 wherein said preset means also establishes a predetermined cumulative total of the pulses of said pulse trains for a preselected time interval and said comparing means compares the total number of pulses of said pulse trains from said received pulses to said predetermined total during a preselected time interval for deriving control pulses functionally related in number to any difference therebetween.

30. The apparatus of claim 29 and further including means for cyclically interrogating said input receiving means and said preset means during said defined time interval.

31. The apparatus of claim 27 and further including means for cyclically operating said input means, said preset means and said comparing means during said defined time interval.

32. A controller for a system having a plurality of dependent parameters which are independently subject to change comprising
means for receiving input pulses representative of units of a measured parameter and for forming said received pulses into a plurality of pulse trains each representative in frequency to the units of the measured parameter,
preset means for establishing predetermined desired values for each parameter,
means for comparing each of said pulse trains to a corresponding value for a parameter over a defined period of time and for deriving error pulses functionally related in number to any difference between the number of pulses in a pulse train as related to an established predetermined value, and
means responsive to said error pulses for selectively obtaining correction factor control pulses which are functionally related to the frequency of a measured parameter.

33. The apparatus of claim 32 and further including means for cyclically sampling said input receiving means and said preset means during said defined period of time.

34. The apparatus of claim 33 and further including means for totalizing said received pulses during a preselected time interval.

35. A controller for a system having a plurality of operating parameters, comprising
means for receiving a plurality of pulse trains each representative of an actual measured magnitude of a parameter,
means for establishing the ratios of selected ones of said pulse trains to at least one other preselected pulse train,
means for establishing a functional correspondence to the ratio of a preselected magnitude for each of the parameters represented by said selected pulse trains to a preselected magnitude for the parameter represented by said one other preselected pulse train,
means for comparing each established ratio to the functional correspondence related thereto during a determined time period, and
means for deriving a train of control pulses functionally corresponding in number to the difference between the comparison of said established ratio and said related functional correspondence and the determined time period.

36. A controller for a system having a plurality of mass transfer parameters comprising
  means for generating a first frequency signal for each parameter which is indicative of the magnitude of the parameter;
  means responsive to said first frequency signals for generating pulse signals functionally related to the mass transfer rates of corresponding parameters, one of said pulse signals being representative of a base parameter;
  means for determining the number of pulses in each pulse signal for a predetermined number of pulses representative of the measured base parameter relative to a preset number of pulses desired for a parameter relative to said predetermined number of pulses for said base parameter and for providing a pulse count output if there is a difference; and
  means responsive to said pulse count output for developing correction pulses functionally related in number to the time period defined by said predetermined number of pulses for said base parameter.

37. A controller for receiving measurement signals of throughput parameters which signals have similar characteristics but represent different values of throughput and providing output control signals calibrated in terms of the respective throughput values comprising:
  means for receiving pulse trains respectively representative of a throughput flow parameter where one of said pulse trains is representative of a base throughput flow parameter;
  means for establishing predetermined throughput parameters for each of said throughput parameters and for a predetermined sum of said throughput parameters;
  means for comparing each of said sampled pulse trains for a throughput parameter and said one pulse train with a corresponding predetermined throughput parameter for a given period of said one pulse train representative of a base throughput parameter and for deriving apparent error pulses, and
  means responsive to said error pulses for supplying control pulses calibrated in terms of said given period of said one pulse train, said comparing means also comparing for an interval of time the sum of throughput values represented by said sampled pulse trains to said predetermined throughput sum, and means for supplying total control pulses if there is a difference therebetween.

38. A controller for receiving measurement signals of throughput parameters which signals have similar characteristics but represent different values of throughput and providing output control signals calibrated in terms of the respective throughput values comprising:
  means for receiving pulse trains respectively representative of a throughput flow parameter where one of said pulse trains is representative of a base throughput flow parameter;
  means for sequentially sampling said receiving means to derive pulse trains representative of each of the other throughput parameters;
  means for establishing predetermined throughput parameters for said other throughput parameters;
  means for sequentially comparing each of said sampled pulse trains for a throughput parameter and said one pulse train with a corresponding predetermined throughput parameter for a given period of said one pulse train representative of a base throughput parameter and for deriving apparent error pulses, and
  means responsive to said error pulses for supplying control pulses calibrated in terms of said given period of said one pulse train.

39. The apparatus of claim 38 and also including in said establishing means a predetermined total throughput value and means to compare the cumulative total of throughputs represented by said sampled pulse trains to said predetermined total throughput for supplying control pulses representative of any error in total throughput.

40. A controller for a system having a plurality of parameters having common measurable units which are functionally interrelated and wherein the parameter units can vary independently of each other comprising:
  means for separately receiving pulses representative of units of a measured parameter and for storing such pulses;
  means for separately receiving pulses representative of units of a measured base parameter;
  means for sequentially interrogating said storing means to obtain the number of stored pulses for each parameter;
  means for determining the number of pulses in each storing means for a predetermined number of pulses representative of the measured base parameter relative to a preset number of pulses desired relative to said predetermined number of pulses for said base parameter which determine a period of time and for providing a pulse count output if there is a difference; and
  means responsive to said pulse count output for developing correction pulses functionally related in number to the determined period of time.

41. A controller for a system having a plurality of dependent parameters wherein it is desired to maintain a predetermined relationship between such parameters comprising:
  means for receiving a plurality of input pulse trains in which the pulses of each train are representative of the magnitude of a parameter for each such input and wherein the pulses of one of said input pulse trains is representative of the magnitude of a base parameter and the pulses of at least one other of said input pulse trains represents a multiple of the actual magnitude of at least one other parameter,
  means for predetermining a relationship of pulses of each pulse train to a selected number of pulses of the pulse train for the base parameter,
  means for comparing the relationship of received pulses of each pulse train to the pulses of the pulse train for the base parameter to the predetermined relationship established by said predetermining means and for producing error output pulses, and
  means responsive to error output pulses produced by comparison of said one other input pulse train for producing correction output pulses functionally related to the time period for said selected number of pulses.

42. The apparatus of claim 41 and further including means coupled to said receiving means for providing said input pulse trains in which the pulses of each train are representative of the magnitude of a parameter and are related to pulses of other trains by a factor of 10.

43. The apparatus of claim 41 and further including means for totaling the magnitudes represented by said input pulse trains for a preselected time period;
  means for predetermining a relationship of the magnitudes in relation to the total number of pulses for said preselected time period;
  means for comparing the magnitudes in relation to said total pulses of said input pulse trains to the predetermined relationship and for producing total correction output pulses.

44. A controller for a system having a plurality of input parameters, comprising
  means for generating pulses for each parameter at a rate related to a magnitude function of each of said parameters, thereby forming pulse trains for each of said parameters,
  input means for receiving and storing said generated pulses for each pulse train,
  preset means for establishing a plurality of predetermined ratio values between a base input parameter and said other input parameters, and
  means for comparing each of said predetermined ratio values with the ratio of different selected ones of said pulse trains to a base parameter pulse train during a defined time interval and for deriving control pulses functionally related in number to any difference therebetween.

45. The controller of claim 44 including means for cyclically interrogating said storing means and said comparing means.

46. The controller of claim 44 and including means for multiplying said control pulses by a function of said defined time interval.

47. A controller for a system having a plurality of parameters to be controlled comprising:

means for generating a first frequency signal for each parameter which is indicative of the magnitude of the parameter;

means responsive to said first frequency signals for generating pulse signals functionally related to the magnitude of the corresponding parameters, one of said pulse signals being representative of a base parameter;

means for determining the number of pulses in each pulse signal for a predetermined number of pulses representative of the measured base parameter relative to a preset number of pulses desired relative to said predetermined number of pulses for said base parameter and for providing a pulse count if there is a difference;

means for cyclically operating said pulse signal means and determining means for obtaining any such pulse counts for different parameters;

means responsive to at least one of said pulse counts for developing correction pulses functionally related in number to the time period defined by said predetermined number of pulses for said base parameter;

means for summing the pulse signals in relation to their magnitude; and means for comparing said summed pulse signals to a predetermined magnitude value and deriving output pulses if there is a difference.

48. A method for maintaining a plurality of input parameters in accord with a preselected functional relationship, comprising:

generating a plurality of electrical pulse signals each generally representative of a value of one of said parameters;

generating a plurality of electrical input pulse trains each having a value functionally related to the value of said one of said parameters;

providing a plurality of preset functions each representative of a preselected value for each of said parameters according to a preselected relationship for a value of a selected base parameter;

generating electrical error pulse signals representative of the functional difference between corresponding ones of said input pulse trains and the pulse train for said selected base parameter, and corresponding ones of said preset functions, and generating from said error pulse signals electrical pulses functionally related in digital terms to the corresponding parameter and said base parameter.

49. A method of controlling measured input parameters which are dependent upon a preselected functional relationship comprising:

generating pulse trains for each of said parameters which indicate by number of pulses the magnitude of the parameter;

electrically comparing, for a predetermined number of a base parameter pulses, the number of pulses for a given parameter to a predetermined number of pulses for such parameter and deriving error output pulses for any difference therebetween, and generating, for any error output pulses, control pulses related in number to the time period for said predetermined number of base parameter pulses.

50. A method of controlling a plurality of measured parameters where it is desired to maintain a predetermined relationship between such parameters comprising:

generating a plurality of input pulse trains in which the pulses of each train are representative of the magnitude of a parameter for each such input;

generating at least one other input pulse train in which the pulses of the input train are representative of the magnitude of a base parameter;

electrically comparing, during a period of time as defined by a determined number of base parameter pulses, the relationship of one pulse train to said base parameter input pulse train to a predetermined desired relationship, and generating error pulses indicative of any difference therebetween.

51. The method of claim 48 and further including the step of sequentially sampling said input pulse trains relative to said preset functions during a time period defined by the value of said selected base parameter and multiplying said error pulse signals by a factor functionally related to the value of a parameter and said time period.

52. The method of claim 51 and further including the steps of totalizing the values of said input pulse trains and comparing said totalized values to a predetermined total value for a preselected time period and generating total control pulses if there is a difference therebetween.

53. The method according to claim 49 and further including the steps of electrically totaling the magnitude of the parameters by counting the pulse trains and comparing said total to a predetermined desired total and generating total control pulses if there is any difference therebetween.

54. A controller for a system having a plurality of input parameters comprising:

input means for receiving pulses representative of units of each of said parameters of a system in pulse trains, each pulse train being representative of one of said parameters, means for predetermining a total of said units as a function of the total number of pulses during a preselected time period, means for comparing the total count of said pulses in terms of said units for said preselected time period to said predetermined total and for deriving total error pulses, and means for selecting one of said pulse trains and for determining the ratio of the pulse count of said one pulse train relative to a predetermined total count of said pulses in terms of said units and for multiplying said error pulses by said ratio to provide correction pulses for the parameter corresponding to said one pulse train.

55. The apparatus of claim 54 and further including timing means for establishing said preselected time period, and means responsive to said timing means and said comparing means for determining the direction of any error from said total count.

UNITED STATES PATENT OFFICE
CERTIFICATE OF CORRECTION

Patent No. 3,590,227     Dated June 29, 1971

Inventor(s) Lawrence C. Porter and Kenneth E. Graves

It is certified that error appears in the above-identified patent and that said Letters Patent are hereby corrected as shown below:

Title page, col. 1, line 12, "3,464,217" should read -- 3,606,903 -- .

Col. 1, line 9, "3,464,217" should read -- 3,606,903 -- .

Col. 6, line 28, "close" should read -- closer -- ; line 34, "160to" should read -- 160 to -- .

Col. 8, line 75, "270B" should read -- 170B -- .

Col. 11, line 21, "is is" should read -- it is -- ; line 46, "ration" should read -- ratio -- ; line 57, "75621000" should read -- 7562 ÷ 1000 -- .

Col. 12, line 65, "is is" should be -- it is -- .

Col. 14, line 31 (claim 8, line 3), "rate in" should read -- rate units in -- .

Col. 14, line 70 (claim 15, line 3), "holding for" should read -- holding register for -- .

Signed and sealed this 22nd day of February 1972.

(SEAL)
Attest:

EDWARD M. FLETCHER, JR.          ROBERT GOTTSCHALK
Attesting Officer                Commissioner of Patents